March 16, 1954  A. L. VANDER LINDE  2,671,947
SAW BLADE FOR CUTTING PRINTING PLATES
AND OTHER PRINTING MATERIALS
Filed Jan. 29, 1951  2 Sheets-Sheet 2

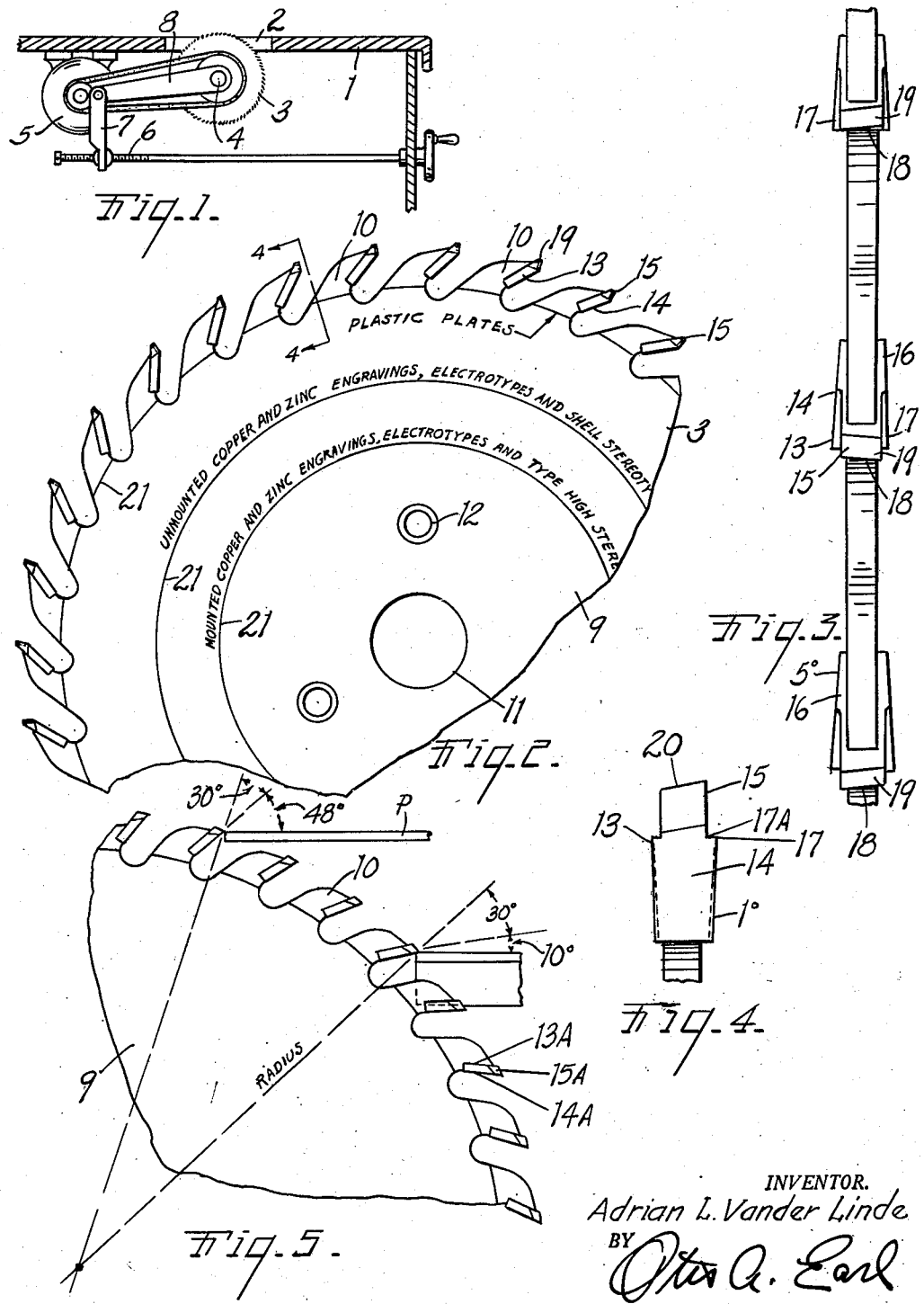

INVENTOR.
Adrian L. Vander Linde
BY
ATTORNEY.

Patented Mar. 16, 1954

2,671,947

UNITED STATES PATENT OFFICE 2,671,947

SAW BLADE FOR CUTTING PRINTING PLATES AND OTHER PRINTING MATERIALS

Adrian L. Vander Linde, Kalamazoo, Mich., assignor to Hammond Machinery Builders, Inc., Kalamazoo, Mich., a corporation of Michigan Application January 29, 1951, Serial No. 208,273

8 Claims. (Cl. 29—103)

This invention relates to improvements in saw blade for cutting printing plates and other printing materials.

The principal objects of this invention are:

First, to provide a saw blade which will maintain its cutting edges in sharp operative condition for a prolonged period of operating time.

Second, to provide a saw which will cut printing plates and other printing materials such as slugs, border and rule, spacing material and base materials with such accuracy and smoothness that the material will not require additional trimming or hand tooling.

Third, to provide a saw blade which will cut all types of printing materials including plastic plates.

Fourth, to provide a saw with multi-angular cutting teeth which will strike the work at predetermined optimum angles when the work is presented to the saw at different predetermined elevations.

Fifth, to provide a circular saw blade for cutting printing materials with radially spaced indicia marks indicating the proper elevation of the blade relative to a saw table for obtaining the right angle of attack of the saw to various types of materials.

Sixth, to provide a circular saw having teeth with narrow outer tips for making an initial cut through mounted and unmounted copper and zinc printing plates and for making a single accurate cut through plastic plates, the blade further having an inner tooth portion adapted to accurately and smoothly trim the sides of the kerf cut by the outer tip in copper and zinc plates.

Other objects and advantages relating to details of my invention will be apparent from a consideration of the following description and claims.

The drawings, of which there are two sheets, illustrate two forms of my saw blade and the manner in which one of these blades acts upon different types of printing plates.

Fig. 1 is a fragmentary vertical cross sectional view through a sawing machine and conventionally illustrating an operative installation of my saw blade.

Fig. 2 is a fragmentary enlarged side elevational view of a first form of my saw blade.

Fig. 3 is a further enlarged fragmentary edge elevational view of the blade shown in Fig. 2.

Fig. 4 is a fragmentary elevational view of the leading face of one of the teeth of the blade shown in Fig. 2 as viewed from the line 4—4 in Fig. 2.

Fig. 5 is a fragmentary side elevational view of a modified form of my saw blade.

Figure 6:
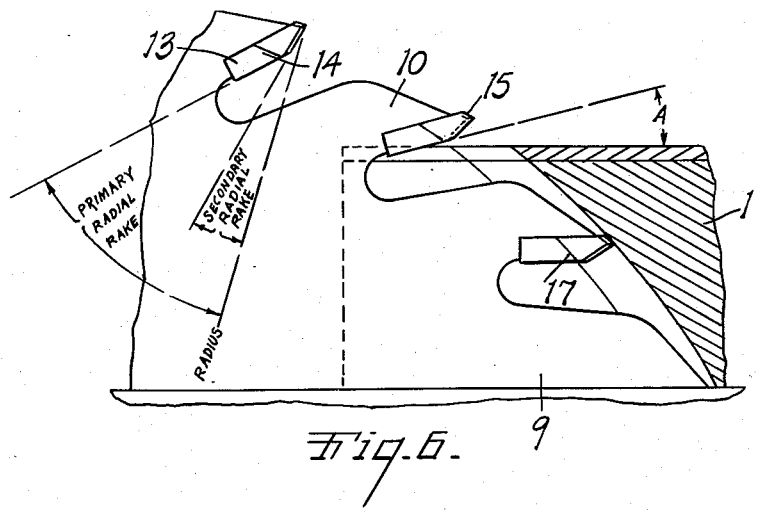
Fig. 6 is a fragmentary side elevational view of the blade shown in Fig. 2 in operative cutting relationship to a mounted copper or zinc printing plate.

As is set forth in the objects of this invention, my saw blade is designed to cut all forms of printing plates now commonly used, including mounted or unmounted copper or zinc plates and plastic plates. As is well known, the mounted plates such as copper or zinc engravings, electrotypes, and also type high stereotypes measure about .918 inch or close to one inch in thickness. The unmounted copper and zinc engravings, electrotypes and shell stereotypes commonly encountered in the printing trade are much thinner, varying between .065 and .152 inch in thickness. The newly developed plastic plates run from .105 to .152 inch in thickness.

All of the foregoing printing plates are cut to size on saw tables with a circular saw projecting upwardly through the bottom of the table. Obviously, the saw must project further to cut the thick mounted printing plates and the vertical projection of the blade through the table must be such that the saw teeth strike the work at the most efficient angle. The elevation of the blade above the table can be varied either by using blades of different diameter on a fixed saw spindle or by employing a vertically adjustable spindle with a single blade. Due to the mechanical requirements for thickness and strength in the saw table surface and the necessity for providing bearings for the saw spindle below the saw table, plate sawing machines in the printers' trade practically universally require a saw blade of at least six inches in diameter. The upper limit of saw sizes is of course indefinite, but from a practical standpoint, no blades are employed which are greater than ten inches in diameter. My invention is therefore limited to circular saw blades between six and ten inches in diameter.

Fig. 1 illustrates a saw table 1 having a slot 2 through which the saw blade 3 projects vertically. The blade is rotatably mounted on a spindle 4 and driven from the motor 5 in any convenient manner. The spindle 4 can be vertically adjusted by means of the screw 6 threadedly engaged with a crank 7 secured to the spindle supporting arm 8. Various mechanical structures for providing this variable support for a saw blade are well known. The blade itself consists of a circular steel disk or body 9 having radially raked teeth 10 formed around the periphery thereof. A hole 11 for receiving the spindle is formed in the center of the body and a plurality of bolt or pin receiving holes 12 are radially spaced around the spindle hole as is common in saws of this type. The leading edges of the teeth 10 are rearwardly notched to receive generally rectangular radially elongated insert blocks 13. The blocks 13 are formed of extremely hard cutting material of which tungsten carbide is the best presently known substance. The insert blocks 13 are slightly wider than the teeth 10 so that the body 9 and teeth 10 actually rotate freely through the kerf cut by the inserts 13. The inserts are secured to the teeth by brazing or other well known methods and project radially outwardly beyond the tips of the teeth 10 for a short distance.

As is most particularly shown in Figs. 3 and 4, the inserts 13 are provided with inner portions 14 of relatively long and wide size and outer tip portions 15 of relatively short and narrow size. The inner portions 14 have rectangular leading faces perpendicular to the plane of the saw and rearwardly and radially inwardly tapering side faces 16. The side faces taper rearwardly at approximately 5° to provide axial clearance as is best illustrated in Fig. 3 and taper radially inwardly at approximately 1° as is best illustrated in exaggerated form in Fig. 4. The leading faces of the inner portions 14 are inclined rearwardly from a radius of the saw drawn to the tip of the tooth at a first or primary angle of radial rake. This angle is indicated in Fig. 6.

The outer tip portions 15 of the inserts being axially narrower than the inner portions 14 leave axially directed shoulders 17 along the tops of the inner portions. The leading faces of the tips 15 are alternately axially raked as is best indicated at 18 in Fig. 3. The leading faces of the tips are further inclined from a radius of the blade by a secondary angle of radial rake indicated in Fig. 6. The outer ends of the tips 15 are swept back as at 19 to provide clearance and are further alternately beveled across the top as at 20. The sides of the outer tips 15 are not provided with any clearance angle.

The outer tip portions 15 which strike the work first form a lead kerf through the work so that the axially thicker inner portions 14 follow along and trim and widen the sides of the kerf. The alternate axial rake and top bevel on the outer tips 15 hold the saw blade centered in the kerf. The shoulders 17 extend into the face of the inner portions 14 for ease in grinding sharp corners at 17a.

In cutting the various types of materials encountered in print shops, I have found that there are certain definite ranges of angles at which the saw tooth should strike the work to obtain a clean sharp cut. For copper and zinc engravings and electrotypes, either mounted or unmounted, the best angle of attack of the saw tooth is 10°, with a possible variation to 5° or 20° without seriously affecting the smoothness of the cut. The newly developed plastic plates are most desirably cut by the tooth striking the work at 60°, although the angle may be varied between 48° and 67°. Type high stereotypes may be cut at an angle of between minus 2° to plus 15° and are thus similar to copper and zinc plates and electrotypes.

Figure 7:
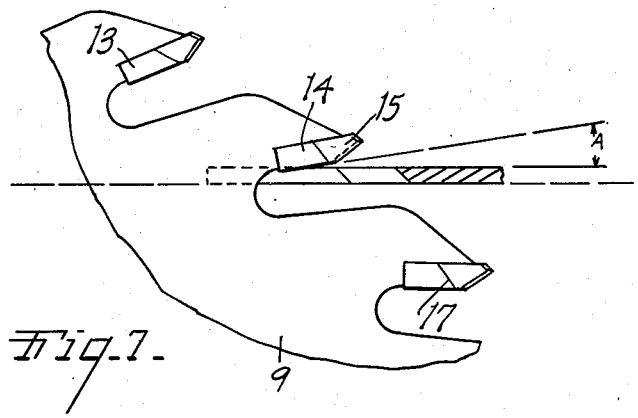
Fig. 7 is a fragmentary side elevational view of the same saw in operative cutting position relative to an unmounted copper or zinc printing plate.
Figure 8:
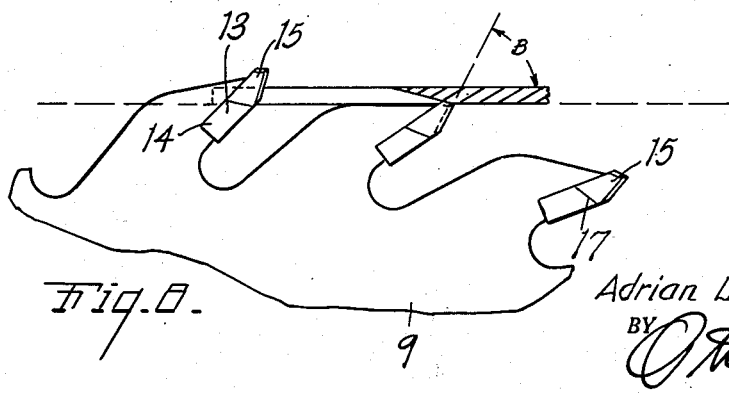
Fig. 8 is a fragmentary side elevational view of the same blade in operative cutting relationship to a plastic printing plate.

In Figs. 6 to 8, I have illustrated how the desired angles of attack of the saw teeth against the work may be obtained with my saw. In Fig. 6, the inclined inner portion 14 of the insert strikes the work at an angle A which can be made to fall within the previously described limits either by elevating the saw or by employing a saw of the proper diameter for the work to be cut. The same leading edge of the inner portion 14 will operate on unmounted plates at the angle A as indicated in Fig. 7 by vertically adjusting the blade. The angle at which the outer tips 15 strike the work in Figs. 6 and 7 is unimportant as the inner portions 14 trim off any burrs or roughness on the side of the cut. When plastic plates are to be cut, the blade is either lowered or a blade of smaller diameter is used so that only the outer tip portions 15 of the saw engage the work at an angle B as illustrated in Fig. 8. The plastic plates are of such a nature that a relatively high angle of attack is desirable and no trimming of the sides of the kerf is necessary.

In Fig. 5 I have illustrated a modified form of my saw blade in which the inserts 13A have a single angle of radial rake along the inserts and are provided with radially outer tips 15A of reduced axial thickness as in the first form of blade described, but the leading faces of both the inner portions 14A and the outer tips 15A are disposed on the same angle of 30° from a radius of the saw as indicated.

By changing the elevation of the saw shown in Fig. 5, the outer tip portions 15A may be made to strike plastic plates indicated at P at an angle of 48° which is within the range of permissible angles previously described. Theoretically the saw could be elevated considerably relative to the table so that the outer tips 15A would strike the plastic plate at any increased angle. The same is true of the first form of the blade described but in either case this would require the inner thicker portions 14 and 14A to pass through the kerf which is undesirable when cutting plastic plates. The outer tips 15 and 15A can be lengthened somewhat to increase the range through which the blades may be adjusted for cutting plastic plates but this expedient is obviously limited by the practical requirement of providing the necessary backing for the tips.

The formula for determining the vertically adjusted position for either of the foregoing blades is expressed in the terms $$R = Z - \theta$$

in which R is the angle of radial rake and Z is the angle between the horizontal and a radius of the saw drawn to the working tooth and $\theta$ is the desired angle of attack of the cutting edge of the blade with respect to the horizontal surface of the work. With the values of $\theta$ already experimentally determined, as pointed out above, and with a known radius of any given saw blade it is a simple matter to determine the elevation to which the saw should project above the table to obtain any desired cutting angle. It should be apparent that the elevation of the top of the work above the center of the saw is equal to the thickness of the work plus a distance from the top of the table to the axis of the saw. The sine of the angle Z is then equal to this total distance from the axis of the saw to the top of the work divided by the radius of the saw. With the value of the angle Z predetermined from the above formula, for any particular type of work it is obviously possible to solve the equation $$\sin Z = \frac{e+t}{r}$$

where $t$ equals the thickness of the work and $e$ equals the distance between the axis of the saw and the top of the saw table and $r$ equals the radius of the saw. After the radial rake of the saw teeth, either in single or double angle, has been determined for a particular saw, I prefer to solve the last equation for $e$ and mark the side of the saw blade with three concentric indicia circles as indicated at 21 so that the operator of a sawing machine with a vertically adjustable spindle has only to elevate the saw so that the proper indicia circle is tangent to the top of the saw table in order to quickly and accurately adjust the saw for cutting any of the several forms of printing plates. Of course when the spindle of the sawing machine is not adjustable the machine must be provided with three different interchangeable saw blades for effectively cutting the various types of plates. In this case, a simple indicia on each blade indicating the type of material which it is adapted to cut will suffice.

Having thus described my invention, what I claim as new and desire to secure by Letters Patent is:

1. A circular saw for sawing printing plates comprising, a steel disk body having teeth equiangularly spaced around the periphery thereof, inserts consisting of blocks of tungsten carbide secured to the leading edges of said teeth with the outer ends of the inserts disposed along a circle of approximately seven inch diameter, said inserts having relatively long inner portions with their leading faces disposed at a primary angle of radial rake of between 30° and 50° and with the sides of said inner portions tapered rearwardly to provide clearances, said inserts having relatively short outer tips of less axial thickness than said inner portions and with their leading faces disposed along a secondary angle of radial rake of between 0° and 42°, the leading faces of said tip portions being alternately axially raked, and three indicia marks on the side of said body disposed at different radial distances from the center thereof and indicating the elevation to which the blade should be raised with respect to a saw table for obtaining the optimum cutting angle of said inserts with different printing plates.

2. A circular saw for sawing printing plates comprising, a steel disk body having teeth equiangularly spaced around the periphery thereof, inserts consisting of blocks of tungsten carbide secured to the leading edges of said teeth with the outer ends of the inserts disposed along a circle of between six and ten inches in diameter, sand inserts having relatively long inner portions with their leading faces disposed at a primary angle of radial rake of between 20° and 50° and with the sides of said inner portions tapered rearwardly to provide clearances, said inserts having relatively short outer tips and with their leading faces disposed along a secondary angle of radial rake of between 0° and 42°, and three indicia marks on the side of said body disposed at different radial distances from the center thereof and indicating the elevation to which the blade should be raised with respect to a saw table for obtaining the optimum cutting angle of said inserts with different printing plates.

3. A circular saw for sawing printing plates comprising, a steel disk body having teeth equiangularly spaced around the periphery thereof, inserts consisting of blocks of tungsten carbide secured to the leading edges of said teeth with the outer ends of the inserts disposed along a circle of ten inch diameter, said inserts having their leading faces disposed at a primary angle of radial rake of between 22° and 32° and with the sides of the inner portion thereof tapered rearwardly to provide clearances, said inserts having relatively short outer tips of less axial thickness than said inner portion, the leading faces of said tip portions being alternately axially raked, and three indicia marks on the side of said body disposed at different radial distances from the center thereof and indicating the elevation to which the blade should be raised with respect to a saw table for obtaining the optimum cutting angle of said inserts with different printing plates.

4. A circular saw for cutting printers' materials comprising a steel disk body having teeth around the periphery thereof, blocks of tungsten carbide inserted in and secured to the leading edges of said teeth and extending to a diameter of approximately seven inches, the leading faces of said inserts being disposed along an angle of radial rake of between 20° and 30°, said inserts having relatively long inner portions with rearwardly tapered sides and relatively short outer tips of less axial thickness than said inner portions, the leading faces of said outer tips being alternately axially raked, and indicia marks on the side of said body at radially spaced positions indicating the proper elevation of the saw with respect to a work supporting surface for obtaining a predetermined angle of attack between said inserts and work pieces of different material and thickness.

5. A circular saw for cutting printers' materials comprising a steel disk body having teeth around the periphery thereof, blocks of tungsten carbide inserted in and secured to the leading edges of said teeth and extending to a diameter of between six and ten inches, the leading faces of said inserts being disposed along an angle of radial rake of between 22° and 50°, said inserts having relatively long inner portions with rearwardly tapered sides and relatively short outer tips of less axial thickness than said inner portions, the leading faces of said outer tips being alternately bevelled and axially raked, and indicia marks on the side of said body at radially spaced positions indicating the proper elevation of the saw with respect to a work supporting surface for obtaining a predetermined angle of attack between said inserts and work pieces of different material and thickness.

6. A circular saw for cutting printers' plates comprising a steel disk body having teeth around the periphery thereof, blocks of hard cutting material inserted in and secured to the leading edges of said teeth and extending to a diameter of seven inches, the leading faces of said inserts having inner portions disposed along a primary angle of radial rake of 40°, said inner portions having rearwardly tapered sides, the leading faces of said inserts having relatively short outer tips of less axial thickness than said inner portions and disposed at a secondary angle of radial rake of 10°, and indicia marks on the side of said body at radially spaced positions of 1¾, 2½ and 3⅛ inches indicating the proper elevation of the saw with respect to a work supporting surface for obtaining a predetermined angle of attack between said inserts and work pieces of different material and thickness.

7. A circular saw for cutting printers' plates comprising a steel disk body having teeth around the periphery thereof, blocks of hard cutting material inserted in and secured to the leading edges of said teeth, the leading faces of said inserts having inner portions disposed along a primary angle of radial rake, said inner portions having rearwardly tapered sides, the leading faces of said inserts having relatively short outer tips of less axial thickness than said inner portions and disposed at a secondary angle of radial rake, and indicia marks on the side of said body at radially spaced positions indicating the proper elevation of the saw with respect to a work supporting surface for obtaining angles of attack of between 5° and 20° between said inner portions and work pieces of different material and thickness, and for obtaining an angle of attack of between 48° and 67° between said outer tips and work pieces of plastic printing plate.

8. A circular saw for sawing printing plates comprising, a disk body having teeth spaced around the periphery thereof, inserts consisting of blocks of hard cutting material secured to the leading edges of said teeth with the outer ends of the inserts disposed along a circle, said inserts having relatively long inner portions with their leading faces disposed at a primary angle of radial rake and with the sides of said inner portions tapered rearwardly to provide clearances, said inserts having relatively short outer tips of less axial thickness than said inner portions and with their leading faces disposed along a secondary angle of radial rake, and three indicia marks on the side of said body disposed at different radial distances from the center thereof and indicating the elevation to which the blade should be raised with respect to a saw table for obtaining the optimum cutting angle of said inserts with different printing plates, the location of said indicia marks being determined by the formulae $R = Z - \theta$ and $$\sin Z = \frac{t + e}{r}$$

where $R$ = an angle of radial rake of the inserts, and $Z$ is a predetermined angle falling within the range of 5° and 20° for metal plates and between 48° and 67° for plastic plates, and where $\theta$ is an angle of rotation of a tooth from the vertical at which the tooth strikes the work, and where $t$ = the thickness of the work and $r$ = the radius of the saw, and where $e$ equals the distance of the indicia from the center of the saw.

ADRIAN L. VANDER LINDE.

References Cited in the file of this patent

UNITED STATES PATENTS

| Number | Name | Date |
|---|---|---|
| 88,649 | Machamer | Apr. 6, 1869 |
| 1,861,218 | Huther | May 31, 1932 |
| 2,407,501 | Kraus | Sept. 10, 1946 |
| 2,528,226 | Hildebrant | Oct. 31, 1950 |
| 2,600,272 | Segal | June 10, 1952 |

FOREIGN PATENTS

| Number | Country | Date |
|---|---|---|
| 60,147 | Netherlands | Nov. 15, 1947 |
| 64,974 | Germany | Oct. 17, 1892 |
| 321,115 | Germany | May 22, 1920 |
| 537,764 | Great Britain | July 4, 1941 |
| 578,519 | Great Britain | July 2, 1946 |
| 601,520 | Great Britain | May 7, 1948 |
| 703,369 | Germany | Mar. 7, 1941 |

OTHER REFERENCES

Metal Cutting Data Sheets, Sheet 9, CR–19–2, July 1945.